United States Patent Office 3,345,395
Patented Oct. 3, 1967

---

3,345,395
PROCESS FOR PREPARING MONOISOCYANATES
Gerhard Müller, Leverkusen, and Rudolf Merten, Cologne-Flittard, Germany, assignors to Farbenfabriken Bayer Aktiengesellschaft, Leverkusen, Germany, a German corporation
No Drawing. Filed Jan. 28, 1964, Ser. No. 340,826
Claims priority, application Germany, Feb. 6, 1963,
F 38,942
14 Claims. (Cl. 260—453)

This invention relates to an improved process for the production of organic monoisocyanates and, more particularly, to a method of preparing said isocyanates which avoids the use of phosgene.

A wide variety of processes are known for the production of organic isocyanates. The process in most general use, however, is that of phosgenation of primary amines. In addition, however, other methods not requiring phosgene are suitable for the preparation of organic isocyanates including, for example, the Curtius rearrangement of acid azides as well as the Hofmann and Lossen rearrangements. Moreover, it is known to thermally decompose carbamates and ureas to prepare the corresponding isocyanate. Still another method of prepaing an isocyanate while avoiding the use of phosgene is to react an N,N'-disubstituted or trisubstituted urea with a relatively high boiling isocyanate. The latter process results in the isocyanate separating out and leaving the organic radical of the starting material on the urea. This process, however, suffers from the disadvantage that the ureas are not very soluble in the isocyanates so that large excesses of the isocyanate initially employed are required.

It is desirable to have a process for the production of isocyanates which avoids the use of phosgene because some of the amines have other phosgene sensitive groups in the molecule. Furthermore, not all of the monoisocyanates are obtainable by the phosgenation of amines.

It is therefore an object of this invention to provide a process for the preparation of organic monoisocyanates which avoids the use of phosgene and simultaneously offers improved yields of relatively low boiling organic monoisocyanates. A further object of this invention is to provide a process for the preparation of organic monoisocyanates wherein substantially stoichiometric amounts of reactants can be used. A further object of this invention is to provide an improved process of preparing organic monoisocyanates from higher boiling isocyanates. A still further object of the invention is to provide a catalyst system for the production of improved isocyanates. Still another object of the invention is to provide a process for the production of isocyanates where the corresponding amine is difficult to obtain or is unobtainable.

The foregoing objects and others which will become apparent from the following description are accomplished in accordance with the invention, generally speaking, by providing a process for the production of organic monoisocyanates wherein a carbamic acid ester is reacted with an organic isocyanate having a boiling point above the isocyanate corresponding to said cabamic acid ester under substantially anhydrous conditions and in such proportions that there is at least one equivalent of isocyanate present per urethane group of said carbamic acid ester. The present invention therefore contemplates an improved process for the preparation of relatively low boiling organic monoisocyanates by reacting the corresponding carbamic acid ester with a higher boiling organic isocyanate under substantially anhydrous conditions, preferably at a temperature of from about 100 to about 270° C. and, if desired, in the presence of a catalyst as more fully set forth below.

The invention is particularly applicable to the production of organic monoisocyanates which boil in the range of from about 20° C./760 mm. Hg to about 160° C./12 mm. Hg and aliphatic monoisocyanates having a boiling point of from about 20° C. to about 120° C./12 torrs. The process according to the invention can be represented by the following equation:

R—NH—COOR'+R"—NCO→
RNCO+R"—NH—COOR' wherein R, R' and R" represent organic radicals. The foregoing equation illustrates the process of the invention using a monoisocyanate as a starting material. A polyisocyanate could be substituted and the carbamic acid ester in the product of the equation would differ accordingly.

The new process offers a number of advantages over the known processes for the production of isocyanates. In particular, it can be used for the production of organic monoisocyanates which were not heretofore obtainable by the phosgenation of amines in some cases because of the presence of other phosgene sensitive groups in the amine molecule. Compared with the known processes referred to above and particularly to the process of reacting N,N'-disubstituted or trisubstituted ureas with higher boiling isocyanates, hereinafter referred to as the urea process, the present invention has numerous advantages. In particular, it overcomes the difficulty of the urea process, in that the carbamic acid esters are readily soluble in the organic isocyanates used as starting materials. Thus, in contrast to the urea process, it is possible to operate, in accordance with the present invention, without any excess of the starting isocyanate and to use only that quantity which is necessary for the reaction. In other words, it is preferred to have at least one equivalent of isocyanate present per urethane group in the carbamic acid ester. It is preferred to have from 1.1 to 10 equivalents of isocyanate present per urethane group.

Furthermore, the process of the present invention offers an excellent method for the production of isocyanates where the corresponding amine is unobtainable or only difficulty obtainable. It is not necessary to proceed through the amine route at all, but one may obtain the N-substituted carbamic acid esters used as starting materials in the process of the present invention in good yields by addition of cationically polymerizable olefins to carbamic acid esters (see Belgian Patent 625,748). The conditions for the production of isocyanates according to the present invention are very gentle and the lower boiling isocyanate produced can be extracted from the reaction medium immediately after it is formed.

Some of the substituted carbamic acid esters used as starting materials for the process of the present invention are described in the literature and can be produced by reaction of the corresponding amines with chlorocarbon acid esters including phosgene by the well-known reactions. The carbamic acid esters are preferably nitrogen substituted and have the general formula RNHCOOR' wherein R and R' are organic radicals and have the same meaning throughout the specification. R and R' are preferably saturated or unsaturated, substituted or unsubstituted hydrocarbon radicals, including alkyl, alkenyl, cycloalkyl, cycloalkenyl, aralkyl, alkaryl, aryl, heterocyclic and the like; R' is preferably saturated or unsaturated alkyl, cycloalkyl, aralkyl, aryl, heterocyclic or the like. The radical R, in addition to the radicals which are suitable for R', can also be haloalkyl, cyanoalkyl, alkoxy-chlorocarbonyl alkyl, N,N-dialkyl amino alkyl, N-(chorocarbonyl) amino alkyl and the like. To give specific examples, where alkyl is the organic radical, it may be any suitable alkyl radical including, for example, methyl, ethyl, propyl, butyl, amyl, hexyl, heptyl, octyl, nonyl, decyl or the like, preferably having from 1 to 10 carbon atoms. Where alkenyl radicals are contemplated, any suitable alkenyl radical may be used such as, for example, ethenyl, 1-propenyl, 2-butenyl, 1-pentenyl, 2-pentenyl, 1-hexenyl, 2-hexenyl, 1-heptenyl, 3-heptenyl, 1-octenyl, 5-octenyl, 1-nonenyl, 1-decenyl and the like. Where cycloalkyl radicals are contemplated, any suitable cycloalkyl radical may be used including, for example, cyclobutyl, cyclopentyl, cyclohexyl, cyclooctyl and the like. Where cycloalkenyl radicals are contemplated, and such suitable radical may be used including for example, cyclopentenyl, cyclohexenyl, cyclooctenyl and the like. Where aralkyl radicals are contemplated, any suitable such radical may be used including, for example, benzyl, phenyl ethyl, phenyl propyl and the like. Any suitable alkaryl radical may be used including, for example, tolyl, xylyl or the like. Any suitable aryl radical may be used including, for example, phenyl, diphenyl or the like. Any suitable heterocyclic radical may be used including, for example, 3-pyridyl, indolyl, triazolyl or the like. Where haloalkyl is the alkyl radical, any suitable such radical may be used including, for example, 2-chloropropyl, beta-chloroethyl, 5-chloroheptyl and the like. Any suitable cyanoalkyl radical may be used such as, for example, 3-cyanopropyl and the like. Any suitable alkoxy chlorocarbamyl alkyl radical may be used including, for example, methoxy chlorocarbamyl-ethyl and the like. Any suitable N,N-dialkyl aminoalkyl radical may be used including, for example, N,N-dimethyl aminoethyl and the like. Any suitable N-(chlorocarbamyl) aminoalkyl radical may be used including, for example, N-(chlorocarbamyl) aminoethyl and the like. It is to be understood that these radicals are moreover representative of the organic radicals represented by R and R' in the foregoing equation which illustrates the process of the invention and that they are intended to provide specific illustrations of the radicals represented by R and R' in the claims.

Any suitable organic isocyanate may be used for reaction with the carbamic acid esters provided that its boiling point is above that of the isocyanate formed from the N-substituted carbamic acid ester. It is preferred that the boiling point be at least ten degrees above the boiling point of the isocyanate to be formed from the N-substituted carbamic acid ester. The following are examples of mono- and polyisocyanates which are suitable to be used in accordance with the process of the invention. It is to be understood that the radical R" employed in the foregoing equation illustrating the process of the invention can be obtained by removing one —NCO group from the isocyanates listed below. The isocyanates preferably have the formula R"(NCO)$_n$ where $n$ is 1–4.

Any suitable aliphatic monoisocyanate and/or polyisocyanate may be used such as dodecyl, oleyl and stearyl isocyanates, hexane and dodecane diisocyanates, aromatic monoisocyanates and/or polyisocyanates such as phenyl isocyanate, substituted phenyl isocyanates, such as 2,4,6-trimethyl phenyl isocyanate and 3,4-dichlorophenyl isocyanate, diphenyl-methane-4-isocyanate, naphthyl-2-isocyanate and pyrenyl-3-isocyanate, as well as diisocyanates of benzene and its homologues, for example, 1,3-phenylene-, 1,4-phenylene-, 1-methyl-benzene-2,4- and 1-methylbenzene-2,6-diisocyanate and their isomeric mixtures, mono-, di- and triisopropylbenzene diisocyanates, polyisocyanates of naphthalene, diphenylmethane and triphenylmethane, with polynuclear ring systems or of polyphenyl compounds. Examples of the last mentioned classes of substance are naphthalene-1,4-, naphthalene-1,5-, diphenyl-4,4'-, diphenylmethane-4,4'-, anthraquinone-2,6-, triphenylmethane - 4,4',4"-triisocyanate, 4,4'-dimethyl-diphenylmethane - 2,2',5,5'-tetraisocyanate, 4,4',4"-triisocyanatophosphoric acid triphenyl ester as well as polyphenyl polymethyl polyisocyanates as disclosed in U.S. Patent 2,683,730, such as obtained by aniline/formaldehyde condensation and subsequent phosgenation. The polyisocyanates used according to the invention can also be substituted by halogen, alkoxy, azo, nitro, cyano, ester or sulphone groups. Examples of these are 1-chlorobenzene-, 1-nitrobenzene-, and 1-methoxybenzene-2,4-dissocyanate, tetrachloro-p-phenylene diisocyanate, azobenzene-4,4'-diisocyanate and benzidine-sulphone-4,4'-diisocyanate.

Mixtures of different monoisocyanates and/or polyisocyanates, possibly in crude form, can be used for carrying out the reaction with the carbamic acid ester.

It is necessary in the process of the present invention to carry out the reaction under substantially anhydrous conditions and in many cases it is desirable to use an inert organic solvent. Suitable solvents are, for example, hydrocarbons such as, for example, benzene, benzine, heptane, octane, hexane, naphthalene and the like, halogenated hydrocarbons such as orthodichlorobenzene, esters such as ethylene glycol monoethylether acetate; ketones such as acetone, methylpropyl ketone or the like; ethers such as diethyl ether of diethylene glycol; sulphides such as dimethyl sulphide; sulphones such as dimethyl sulphone; substituted amides such as N-methyl pyrrolidone as well as mixtures thereof or the like.

The production of the organic monoisocyanates in accordance with the invention may be carried out by direct reaction between the N-substituted carbamic acid esters and the higher boiling mono- and poly-isocyanates. It is often expedient to work under a blanket of inert protective gas such as nitrogen or argon when carrying out the reaction. Moreover, it is often advantageous to add a catalyst for the reaction. Both acid and basic catalysts may be used in anhydrous form. Examples of acid catalysts include the Lewis type such as, for example, boron trifluoride, sulfuric acid, para-toluene sulphonic acid, hydrochloric acid, zinc chloride and the like. One may also use carbamic acid chloride, acid ion exchangers, iron acetonyl acetonate, molybdenum chloride, dibutyl tin diacylates such as, for example, dibutyl tin dilaurate, stannous acylates such as stannous octoate, stannous oleate and the like. Examples of basic catalysts include the following which are exceptionally suitable for promoting the reaction of stearically hindered isocyanates: dimethyl benzyl amine, triethylene diamine, permethylated diethylene triamine, N-alkyl morpholines such as N-ethyl morpholine, N-methyl morpholine and the like. In some cases it is even possible to use potassium carbonate or sodium hydroxide as the basic catalyst. The proportions between the N-substituted carbamic acid ester and the higher boiling monoisocyanate or polyisocyanate can be varied over wide ranges provided there is at least one equivalent of isocyanate present for each urethane grouping. The reaction is preferably carried out at a temperature of from about 100 to 270° C., most preferably between 150 and 250° C. The time of reaction varies but is usually complete within a few hours. The reaction components can be initially supplied to the reaction vessel simultaneously while mixed with a solvent and heated. In some cases, however, it may be expedient to only supply one reaction component in bulk to the reaction vessel and then gradually add the second component. The mechanism of the reaction is not understood but it may be assumed that it proceeds through the intermediate formation of allophanates.

The isocyanates of the invention are useful where isocyanates of this type have been used heretofore, particularly as insecticides, for coatings and adhesives, as well as for the production of elastomers, foams and the like where they are used in conjunction with polyisocyanates.

The invention is further illustrated by the following examples in which parts are by weight unless otherwise specified.

Example 1

A mixture of about 580 parts of N-tertiary butyl-carbamic acid ethyl ester, about 522 parts of an isomer mixture of 80 percent 1-methylbenzene-2,4- and 20 percent 1-methylbenzene-2,6-diisocyanate and about 250 parts of a polyphenyl methylene polyisocyanate obtained by condensing aniline with formaldehyde and then phosgenating the resulting mixture of amines, said mixture containing about 90 percent 4,4'-diphenylmethane diisocyanate, is heated with mechanical stirring for several hours under nitrogen to about 170–180° C. When the reaction mixture reaches a boiling temperature between about 80 and about 90° C., about 396 parts of tertiary butyl isocyanate are distilled off; towards the end of the reaction, it is expedient to slightly reduce the pressure on the vessel to facilitate removal of the isocyanate. The crude product is redistilled through a column and there are obtained about 315 parts of the pure tertiary butyl isocyanate with the boiling point at 760 mm. Hg 84° C.

Example 2

A mixture of about 100 parts of N-isobutyl carbamic acid ethyl ester and about 175 parts of the polyphenyl methylene polyisocyanate of Example 1 are heated while stirring for several hours to about 190–220° C. About 44 parts of isobutyl isocyanate distill over between about 95 and about 112° C. After redistillation through a column, there are obtained about 40 parts of the pure isobutyl isocyanate of boiling point at 760 mm. Hg 104–106° C.

Example 3

About 145 parts N-n-butyl carbamic acid ethyl ester are heated together with about 87 parts of an isomer mixture of 80 percent 1-methylbenzene-2,4- and 20 percent 1-methylbenzene-2,6-diisocyanate and about 125 parts of the polyphenyl methylene polyisocyanate of Example 1. The heating takes place for several hours at about 210–240° C. As distillate, about 67 parts of crude n-butyl isocyanate pass over at about 90–120° C. After rectification, there are obtained about 45 parts of the pure n-butyl isocyanate of boiling point at 760 mm. Hg 115–116° C.

Example 4

About 70 parts of N-isopropyl carbamic acid ethyl ester are heated for several hours at about 200–205° C. with about 50 parts of an isomer mixture of 80 percent 1-methylbenzene-2,4- and 20 percent 1-methylbenzene-2,6-diisocyanate and about 70 parts of a polyphenylene methylene polyisocyanate of Example 1. About 42 parts of isopropyl isocyanate distill over between about 92 and 93° C. and preferably the pressure is reduced slightly towards the end of the reaction. After redistillation through a column, there are obtained about 35 parts of the pure isopropyl isocyanate of boiling point at 760 mm. Hg 76° C.

Example 5

About 83 parts of N-phenyl carbamic acid ethyl ester are heated for several hours at about 210° C. together with about 87 parts of an isomer mixture of 80 percent 1-methylbenzene-2,4- and 20 percent 1-methylbenzene-2,6-diisocyanate. While the pressure is gradually reduced to about 30 mm. Hg, about 48 parts of crude phenyl isocyanate distill off. After redistillation, there are obtained about 35 parts of the pure phenyl isocyanate of boiling point at 25 mm. Hg 65–66° C.

Example 6

As a modification of Example 1, about 290 parts of N-tertiary butyl carbamic acid ethyl ester with an equimolar quantity of naphthylene-1,5-diisocyanate (equals about 210 parts) and about 3 parts p-toluene sulphonic acid as catalyst is heated.

In this case, tertiary butyl isocyanate distils off at a reaction temperature of about 140–145° C.; it is obtained in a yield of about 175 parts.

It is to be understood that the foregoing working examples are given for the purpose of illustration and that any other suitable carbamic acid ester, higher boiling organic polyisocyanate, acid or basic catalyst or the like could have been used therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the production of organic monoisocyanates which comprises reacting an N-monosubstituted carbamic acid ester with an organic isocyanate having a boiling point above the isocyanate corresponding to said carbamic acid ester under substantially anhydrous conditions in such proportions that at least one equivalent of —NCO is present per urethane group, and separating the resulting organic monoisocyanate from the reaction mixture.

2. A process for the production of an organic isocyanate having the formula R—NCO which comprises reacting under substantially anhydrous conditions at a temperature of from about 100 to about 270° C. a carbamic acid ester having the formula RNHCOOR' with an organic isocyanate having the formula R"(NCO)$_n$ wherein $n$ is an integer of from 1 to 4, R and R' are organic radicals and R" is an organic radical sufficient to give the organic isocyanate used as a starting material a boiling point substantially above that of the isocyanate R—NCO produced by the process.

3. A process for the production of organic monoisocyanates which boil in the range of from about 20° C./760 mm. Hg to about 160° C./12 mm. Hg which comprises mixing an N-monosubstituted carbamic acid ester having one organic radical on the nitrogen atom corresponding to said isocyanate to be produced, with an organic isocyanate having a boiling point at least ten degrees above that of the isocyanate to be produced and boiling within the range of from about 100 to about 350° C., heating the resulting mixture to a temperature within the range of from about 100° C. to about 270° C. while there is at least one equivalent of isocyanate present per urethane grouping and until the organic radical forming the higher boiling isocyanate exchanges with the organic radical attached to the nitrogen atom of the carbamic acid ester and removing the low boiling monoisocyanate from the reaction mixture.

4. The process of claim 3 wherein there are from about 1.1 to 10 equivalents of isocyanate used per urethane group of said carbamic acid ester.

5. The process of claim 3 wherein said carbamic acid esters are adducts of cationically polymerizable olefins and unsubstituted carbamic acid esters.

6. The process of claim 3 wherein said process is carried out in an inert organic solvent.

7. The process of claim 6 wherein said inert organic solvent is selected from the group consisting of hydrocarbons and chlorinated hydrocarbons.

8. The process of claim 3 wherein an acid catalyst for the reaction is used.

9. The process of claim 8 wherein said acid catalyst is p-toluene sulphonic acid.

10. The process of claim 8 wherein said acid catalyst is hydrochloric acid.

11. The process of claim 3 wherein a basic catalyst for the reaction is used.

12. The process of claim 11 wherein said basic catalyst is triethylene diamine.

13. The process of claim 11 wherein potassium carbonate is used.

14. A process for the preparation of an aliphatic monoisocyanate having a boiling point of from about 20° C. to about 120° C./12 torrs which comprises mixing the corresponding nitrogen monosubstituted carbamic acid ester with an organic isocyanate having a boiling point above about 150° C. in the presence of a catalyst under substantially anhydrous conditions in such proportions that there is from about 1.1 to about 10 equivalents of isocyanate present per urethane group at a temperature of from about 100 to about 270° C. until said low boiling organic monoisocyanate is obtained and separating it from the reaction mixture by distillation.

References Cited

Bunge: Angewandte Chemie, vol. 72, July–December 1960, p. 1002.

CHARLES B. PARKER, *Primary Examiner.*

D. H. TORRENCE, *Assistant Examiner.*